United States Patent [19]
Collette

[11] Patent Number: 5,499,044
[45] Date of Patent: Mar. 12, 1996

[54] METHOD OF PRODUCING POSITIVE PRINTS FROM DIGITAL IMAGE SIGNAL DATA USING A FILM RECORDER

[75] Inventor: Robert P. Collette, Pavillion, N.Y.

[73] Assignee: Eastman Kodak Company, Rochester, N.Y.

[21] Appl. No.: 117,467

[22] Filed: Sep. 7, 1993

[51] Int. Cl.⁶ ........................................ B41J 15/16
[52] U.S. Cl. ........................ 347/232; 358/517; 358/506
[58] Field of Search ................................ 358/500, 506, 358/509, 512, 515, 517, 527, 530, 531, 296, 298, 300, 302; 347/232, 115

[56] References Cited

U.S. PATENT DOCUMENTS

| | | | |
|---|---|---|---|
| 4,231,061 | 10/1980 | Freeman | 358/76 |
| 4,354,739 | 10/1982 | Scanlon et al. | 350/311 |
| 5,101,283 | 3/1992 | Seki et al. | 358/298 |
| 5,231,506 | 7/1993 | Manico et al. | 358/302 |
| 5,329,383 | 7/1994 | Collette | 358/500 |

*Primary Examiner*—Mark J. Reinhart
*Attorney, Agent, or Firm*—Francis H. Boos, Jr.

[57] ABSTRACT

Digital image signal data is applied to a film recorder to produce a pseudo-negative using high gamma transparency film as the negative. The image signal data is modified before application to the film recorder to insert signal values, positive for positive transparency film and negative for negative transparency film, such that upon photographic processing of the transparency film, a negative image is produced with a positive orange mask effect. The pseudo-negative is then used to produce multiple positive print images conventional negative-working print paper.

6 Claims, 2 Drawing Sheets

METHOD OF PRODUCING POSITIVE PRINTS FROM DIGITAL IMAGE SIGNAL DATA USING A FILM RECORDER

FIELD OF INVENTION

This invention relates to the field of photographic production of positive print images from digital image signal data film.

BACKGROUND

Recently, there has been developed a computer based system for scanning negative film images, such as a collection of pictures of school children, to produce digital image signal data that is composited by the computer into page formats. The composited digital image signal data is then output to a suitable digital image printer to generate positive hardcopy prints of the composited images. In a straightforward application, the image signal data is applied to a color thermal printer wherein the images are generated by the application of color dyes onto the print material. Although high quality color prints can be produced in this manner, it is known to be more cost effective to produce multiple color prints by means of photographic processes. It has previously been proposed to take advantage of more cost effective photographic processes for the production of multiple copies by utilizing a thermal printer to dye print a negative image onto a transparent substrate material to produce a pseudo-negative that is then used to optically expose the image onto negative-working photographic print paper which can then be processed using conventional photographic processes to produce the resultant positive print image. See commonly assigned U.S. Pat. No. 5,231,506—Manico entitled "Generation of Hard Copy Color Photo Reproductions from Digitally Created Internegative", issued Jul. 27, 1993.

While quite effective for the purpose, such a pseudo-negative method requires the use of a thermal printer which not all photographic labs possess. However, many potential users of the computer compositing machine described above already have in their photographic labs a film recorder, also referred to as a film writer, which is a device typically used to write digital images to positive slide film such as Ektachrome film produced by Eastman Kodak Company. A known use of such devices in photographic film labs involves the application of computer generated digital image signal data representing a desired graphical image to the film recorder wherein the digital image signal data is converted to an optical image by means of a cathode ray tube (CRT) for exposure onto a positive slide transparency film. The thus produced slides are commonly used as visual aids used in conjunction with oral presentations. Since film recorders are already commonly found in photographic labs, it is highly desirable to have a way in which composited image data derived by digital scanning of negative images can be converted into positive prints via the medium of the film recorder to facilitate the making of multiple prints in a cost effective manner from the digital image signal data. Thus, the objective is to use the film recorder to produce a negative film image from which the multiple positive prints can then be produced on conventional photographic print paper.

In trying to write an image directly to negative film such as Vericolor III film (Eastman Kodak Company), which is a camera negative film, it was discovered that a serious problem existed with this straightforward approach. It was found that, with a CRT-based film recorder, it was not possible to expose the film to a degree sufficient to achieve a density range ($D_{max}$–$D_{min}$) in the resultant negative image which would give an acceptable positive print. As the CRT exposure (image contrast) was increased, the film $D_{max}$ increased as desired, however, the film $D_{min}$ also increased by approximately the same amount, resulting in a nearly constant density range in the negative film images.

The inability to achieve a satisfactory density range on the negative film is attributed to difficulty of exposing negative film with a CRT produced image in a film recorder. Negative films have a very wide exposure latitude due to their inherently low gammas of approximately 0.65 in the case of Vericolor III (Eastman Kodak Company) camera negative film. Thus, it takes a rather large exposure of the film to develop the required density range in the film image (approximately 1.5 D) needed to produce an acceptable tonal range in the positive print. It is believed that attempts to increase the density range in the negative film image by increasing the contrast on the CRT image caused an increase in flare in the lens of the camera used for focusing the CRT image on the film in the film recorder. Additionally, the increased brightness of the CRT image is believed to cause increased internal reflection within the CRT faceplate. The combined effect is to increase the $D_{min}$ level in the negative image as contrast is increased in the CRT image in the attempt to increase the density range in the negative image.

It is therefore an object of the present invention to be able to produce a negative film image in a film recorder with adequate density range to achieve an acceptable positive print from the negative.

SUMMARY OF THE INVENTION

In accordance with the invention therefore, there is provided a method of producing a positive print image from digital image signal data representative of the positive image to be produced, in which the method comprises the steps of modifying the digital image signal data to incorporate therein data values related to a negative film orange mask effect, applying the modified digital image signal data to a digital film writer to produce an exposure image and exposing the exposure image in the film writer onto high gamma transparency film. The method of the invention further comprises the steps of photographically processing the transparency film to produce a negative image with the orange mask effect incorporated therein, exposing the transparency film image onto a negative-working print paper and photographically processing the print paper to produce a positive print image.

The advantage of using high gamma films, such as Ektachrome positive transparency film or Vericolor negative working transparency film, to produce the negative in this application, is that the high gamma values of these films, typically about 2.0 higher, as compared to camera negative film gamma of about 0.6, results in a much smaller exposure requirement to achieve adequate density range in the film to produce an acceptable print. Stated another way, a much lower contrast image on the CRT is needed to achieve the desired tonal range in the pseudo-negative thus reducing the adverse consequences of lens flare and CRT internal faceplate reflections in the film recorder. Thus with the present invention, a "pseudo-negative" is produced using slide transparency film which is normally used to produce a positive image for direct viewing. However, because the slide transparency films are intended for direct viewing, they do not incorporate the orange mask effect needed to produce an acceptable positive print when exposed to negative working photographic print materials. For this reason, the digital image signal data is modified to incorporate values related to the orange mask effect in a manner that results in the orange mask being incorporated in the "pseudo-negative" film image. When writing the negative on positive transparency film, the orange mask values are inserted as positive values which will then be converted directly into an orange mask on the resultant "pseudo-negative". When writing on negative transparency film, the orange mask values are inserted as negative values, corresponding to a generally cyan color, since the negative working transparency film will invert these this color to create an orange mask on the resultant "pseudo-negative".

DETAILED DESCRIPTION

Figure 1:
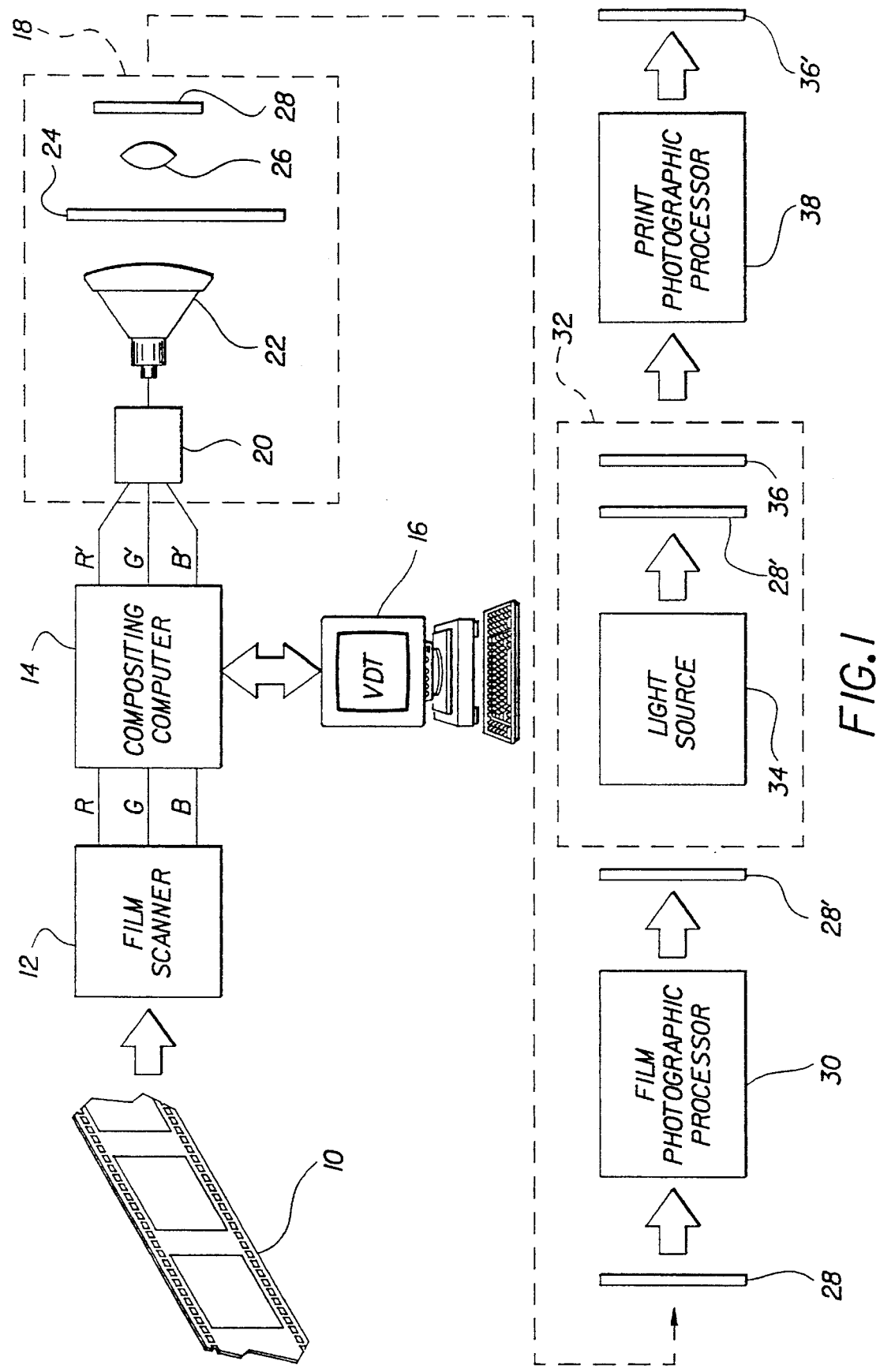
FIG. 1 is a schematic illustration of a system for producing a positive print from digital image signal data using a film writer in accordance with the present invention.

Referring to FIG. 1, apparatus for producing a positive print from digital image signal data comprises means for supplying the digital image signal data which, in the illustrated embodiment, includes a film scanner 12 adapted to produce initial digital image data signals R, G, B, from an image on a conventional negative film strip 10. These signals are applied to a compositing computer 14 wherein a variety of image processing operations are carried out. The operations of computer may typically include image processing via suitable calorimetric transform matrices and look-up tables to provide gamma correction and color balance adjustment to compensate for spectral characteristics of the film on which a pseudo-negative is to be produced. The computer is also adapted to store a number of images and to perform compositing of the images in page formats under user control via a video display terminal 16. The modified signals R', G', B' are then applied to a film recorder 18 to produce a pseudo-negative on transparency film 24. To this end the signals are applied to a CRT driver circuit where they are converted from digital to analog form and then applied to CRT 22 to be converted into an image. As is normal in a CRT film recorder, the image is produced as a sequence of monochromatic images corresponding to the R', G' and B' signals. A filter wheel converts the monochromatic images into successive R, G and B images which are focused by optical means 26 onto transparency film 28. The exposed transparency film 28 is then developed in photographic film processor 30 to produce a negative film image. This film image is then exposed in printer apparatus 32 by a light source 34 onto conventional negative-working photographic print paper 36. The exposed print paper is then developed in print photographic processor 38 to produce the desired positive print 36'.

It will be appreciated from the foregoing description that much of the described process is conventional in nature except for the use of transparency film in the film writer to produce the pseudo-negative 28' and the modifications in the R, G, B signals in computer 14 needed to produce the appropriate negative image in the transparency film 28.

Figure 2:
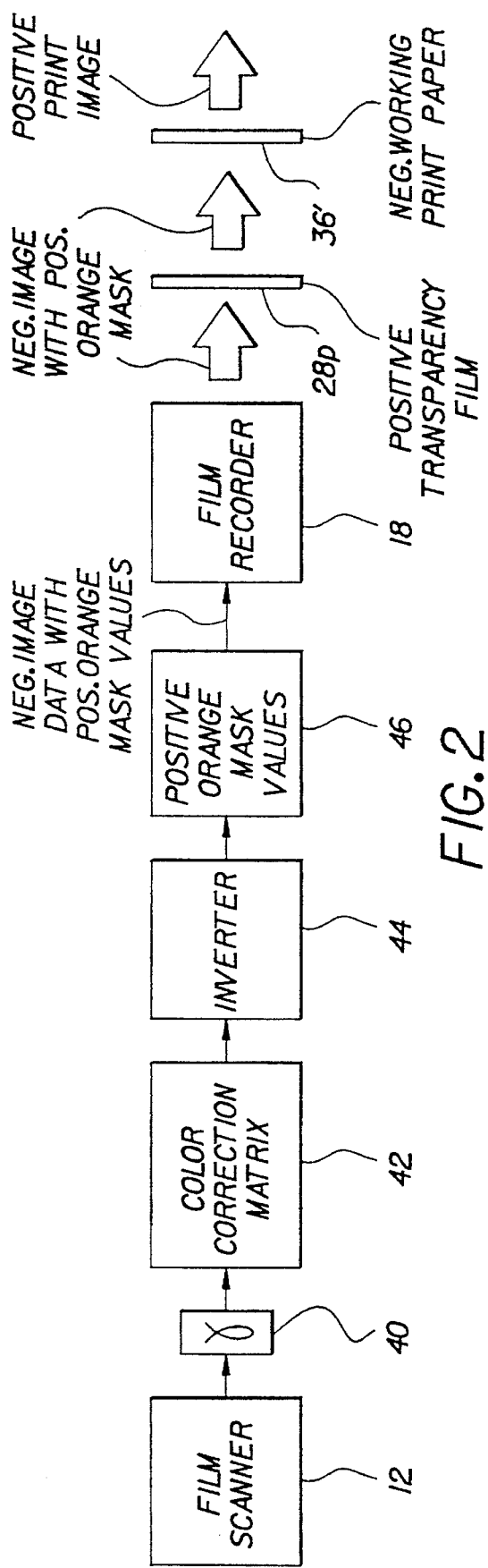
FIG. 2 is a functional flow diagram illustrating the method of the invention using positive transparency film as a pseudo-negative in the production of a positive print.

Turning now to FIG. 2, there will be described the method in which the invention is practiced using positive transparency film such as Ektachrome film. Digital image data signals from film scanner 12 are assumed to be provided as positive image data signals suitable for display on the monitor video display terminals 16 (FIG. 1). Within computer 14, the signals are modified by a gamma correction function 40 which is done to effectively reduce the high gamma characteristic of the Ektachrome film to simulate the lower gamma characteristic of conventional Vericolor III negative film. Following this, the signals are modified in known manner by means of a color correction matrix function 42 to improve, as necessary, the color fidelity of the images. This is, in part, an interactive function in which the user inserts correction control via video display terminal 126. Since the signals at this point are positive for display of the image on the VDT monitor, they are inverted at 44 to convert them into negative signals needed to produce a negative image on the Ektachrome positive transparency film 28. Since Ektachrome film is a positive transparency film designed for exposure in a camera and direct viewing after development, it does not incorporate color adjusted emulsions that introduce an orange mask needed for production of prints on conventional negative-working photographic print paper. For this reason, the digital image signal data is adjusted in computer 14 at 46 to be modified by insertion of values which correspond to a positive orange mask effect to be produced in the Ektachrome pseudo-negative. The resultant negative image signal data modified to incorporate values corresponding to a positive orange mask effect is applied to the film recorder wherein a negative image with a positive orange mask effect is produced and exposed onto the Ektachrome positive transparency film 28p. The resultant pseudo-negative film is then used to produce multiple positive print images in conventional manner on negative working photographic print paper 36', such Ektacolor Portra Paper (Eastman Kodak Company).

Figure 3:
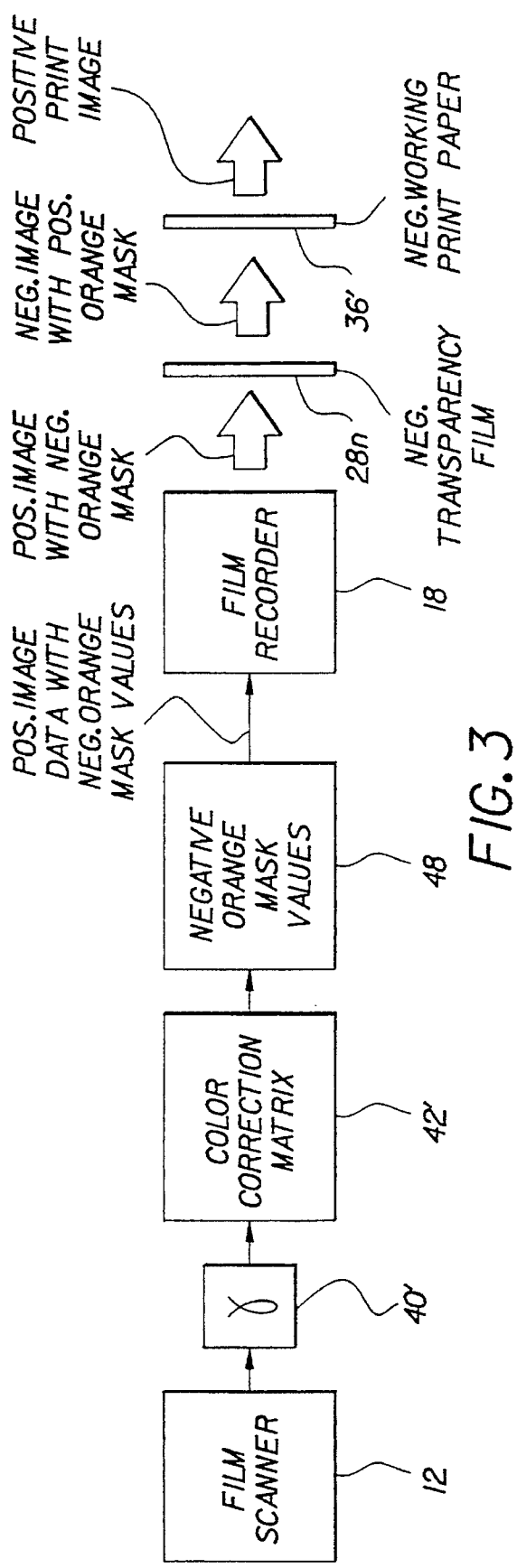
FIG. 3 is a functional flow diagram similar to FIG. 2 using negative transparency film as the pseudo-negative medium.

The invention is not limited to the use of positive transparency film in the production of the pseudo negative. Referring to FIG. 3, the method is illustrated using a negative transparency film such as Vericolor Print or Slide Film which are negative transparency films produced by Eastman Kodak Company. Here the method is similar to that of FIG. 2 except that the gamma correction at 40' is adjusted to compensate for the particular gamma characteristic of the Vericolor negative transparency. In the case of the Ektachrome film of FIG. 2, the gamma is approximately 1.9 while for Vericolor negative transparency film is about 3.2. The color correction applied at 42' is also adjusted to conform to the emulsion characteristics of the Vericolor film. Finally, since the target film is a negative transparency film, it is not necessary to invert the image signal data since the inversion will occur in the film itself. However, the color inversion that occurs in the film requires that the image signal data be modified at 48 to insert values corresponding to a negative orange mask effect which appears visually in the CRT image in film recorder 18 as essentially a cyan color. The positive image and cyan color in the CRT image are then exposed to the negative transparency film 28n wherein they inverted to a negative image with a positive orange mask effect in the resultant pseudo-negative image. As in the case of the method of FIG. 2, this pseudo-negative image is then exposed to conventional negative-working photographic print paper for the production of multiple positive prints.

It will be apparent from the foregoing description that a simple method has been described which solves the problem of how to produce multiple print images using a film recorder that provides the desired tonal range in the print images.

The invention has been described in detail with particular reference to presently preferred embodiments, but it will be understood that variations and modifications can be effected within the scope of the invention as set forth in the claims appended hereto.

In the accompanying drawings, the following reference numerals are used:

10 negative film strip
12 film scanner
14 compositing computer
16 video display terminal
18 film recorder
20 CRT driver circuit
22 CRT
24 filter wheel
26 lens
28 transparency film
30 film photographic processor
32 photographic printer
34 light source
36 negative working print paper
38 print photographic processor
40 gamma correction
42 color correction matrix
44 inverter
46 positive orange mask adjustment
48 negative orange mask adjustment

What is claimed is:

1. A method of producing a positive print image from digital image signal data representative of the positive image to be produced, the method comprising the steps of:

modifying said digital image signal data to incorporate therein data values related to an orange mask effect on negative film;

applying said modified digital image signal data to a digital film recorder to produce an exposure image;

exposing the exposure image in the film recorder onto high gamma transparency three color film;

photographically processing the transparency film to produce a negative image with said orange mask effect incorporated therein;

exposing the transparency film image onto a negative-working print paper; and photographically processing the print paper to produce a positive print image.

2. The method of claim 1 wherein said exposure image is exposed onto a positive transparency film.

3. The method of claim 2 wherein said digital image data is provided as a negative complement to the positive print image and wherein said digital image signal data is modified by positive orange mask values.

4. The method of claim 1 wherein said exposure image is exposed onto a negative transparency film.

5. The method of claim 4 wherein said digital image signal data is provided as positive image signal data and wherein said digital image signal data is modified by values representing a negative orange mask effect such that, upon photographic processing of the negative transparency film, said negative image with positive orange mask effect is produced.

6. The method of claim 1 wherein said transparency film high gamma values are in the range of about 1.9 to about 3.2.

* * * * *